United States Patent [19]

Gary et al.

[11] 4,002,948
[45] Jan. 11, 1977

[54] LONG DELAY ACCELERATION MODULE FOR AN OVERLOAD RELAY SYSTEM

[75] Inventors: Wardell Gary; Glenn R. Taylor, both of Beaver, Pa.

[73] Assignee: Westinghouse Electric Corporation, Pittsburgh, Pa.

[22] Filed: June 2, 1975

[21] Appl. No.: 583,323

[52] U.S. Cl. .................. 317/13 A; 317/36 TD; 317/49; 317/38
[51] Int. Cl.² .................................... H02H 7/08
[58] Field of Search .......... 317/13 A, 36 TD, 13 R, 317/49, 38

[56] References Cited
UNITED STATES PATENTS

| | | | |
|---|---|---|---|
| 2,914,702 | 11/1959 | Diebold | 317/13 A |
| 3,602,783 | 8/1971 | Engle et al. | 317/36 TD X |
| 3,739,229 | 6/1973 | Moran | 317/36 TD X |

Primary Examiner—R. N. Envall, Jr.
Assistant Examiner—Patrick R. Salce
Attorney, Agent, or Firm—M. J. Moran

[57] ABSTRACT

A long acceleration module is provided for use with a current sensor which provides an output voltage which varies with load current. There is also provided an inverse time overload logic module which controls the tripping of a circuit breaker to protect the lines in which the load current flows in relationship to the output voltage of the current sensor. The long acceleration module allows motor startup when a motor is connected to the lines to be protected. The long acceleration module purposely simulates a relatively low voltage for the input to the inverse time overload logic module during the motor startup time when high but generally non-dangerous currents are drawn by the accelerating motor.

4 Claims, 3 Drawing Figures

LONG DELAY ACCELERATION MODULE FOR AN OVERLOAD RELAY SYSTEM

CROSS-REFERENCE TO RELATED APPLICATIONS

Certain inventions related to those disclosed in the present application are disclosed and claimed in copending aplication Ser. No. 504,405 by D. S. Kimmel, W. Gary and G. R. Taylor and application Ser. No. 504,404 by W. Gary and G. R. Taylor both of which were filed on Sept. 9, 1974, and concurrently filed application Ser. No. 583,219, by W. Gary, G. R. Taylor and D. S. Kimmel also filed on June 2, 1975 all of which are assigned to the same assignees as the present application.

BACKGROUND OF THE INVENTION

1. Field of the Invention

The subject matter of this invention relates generally to motor startup protection circuits and relates specifically to those circuits which utilize apparatus for preventing the tripping of a motor protecting circuit breaker during the acceleration of the motor after startup.

2. Description of the Prior Art

High inertia electrical motors often require a substantial period of time to reach normal operating speed after startup has been initated. During this period relatively high line currents are often drawn. It is generally well known that these currents are not excessively dangerous and they generally persist no longer that the time it takes for the motor to reach normal running speed. However, there are other instances when line currents may be drawn which are not due to startup but which may be due to faults or the like. It is desirous in the latter situation to sense excessively high line currents and to provide a signal to an inverse time overload logic module to trip a circuit breaker to protect the motor and the associated lines. Generally the inverse time overload logic module provides an output signal which is inversely related to the value of the line current. This means if the line current is only slightly above rated value it will take a long time after it is initially sensed to trip the circuit breaker. However, if the line current is substantially higher, it will take a shorter time before the circuit breaker is tripped. In the past it has been taught to utilize a current sensor which senses overload current in the line to be protected and provides an output voltage which is related to the overload current. The inverse time overload logic module reacts, as was described previuosly, as a functon of the output voltage. In the past the utilization of a long acceleration module disposed in parallel with the voltage input has been taught. This long acceleration module comprised a Zener diode which was connected across the inverse time overload logic module input to limit the voltage which the current sensor could provide to the latter mentioned module regardless of the amount of current flowing in the lines. The theory behind this was that the highest current likely to occur on the line other than fault current was usually drawn during the acceleration of the motor after startup. The long acceleration module prevented a voltage which would normally be related to this current from appearing across the inverse time overload logic input terminal. However, this presented a disadvantage. If exceptionally high currents occured because of a fault or similar phenomena on the lines after motor startup, the circuit breaker could not be tripped as quickly as might be desired because the long acceleration module would prevent the inverse time overload logic module from providing an output signal at this time to its circuit breaker. It would therefore be advantageous if a long acceleration module could be utilized in conjunction with an inverse time overload logic module during motor startup so that the effects of motor startup on the line currents could be ignored by the inverse time overload logic module. However, after startup had been completed the long acceleration module could be effectively disconnected from the inverse time overload logic module so that any subsequent high current could be interrupted if necessary with high speed by the inverse time overload logic module and its circuit breaker.

SUMMARY OF THE INVENTION

In accordance with the invention a long acceleration module is taught for use with an inverse time overload logic module which cuts out after a predetermined period of time. This provides the very beneficial effect of preventing motor shutdown in response to the relatively high currents of motor startup without subsequently endangering the motor circuit by defeating the purpose of the inverse time overload logic module. To provide this function, a switched Zener diode is provided across the inverse time overload logic module input terminal. The Zener diode switching arrangement is such that the Zener diode operates to limit the voltage across the input terminals of the overload logic module during motor startup. Subsequently the switched Zener diode is cut out of the circuit by opening the switch in response to a predetermined charging time on a resistor-capacitor timing network.

BRIEF DESCRIPTION OF THE DRAWINGS

For a better understanding of the invention reference may be had to the preferred embodiment exemplary of the invention shown in the accompanying drawings in which.

DESCRIPTION OF THE PREFERRED EMBODIMENTS

Figures 1, 2:
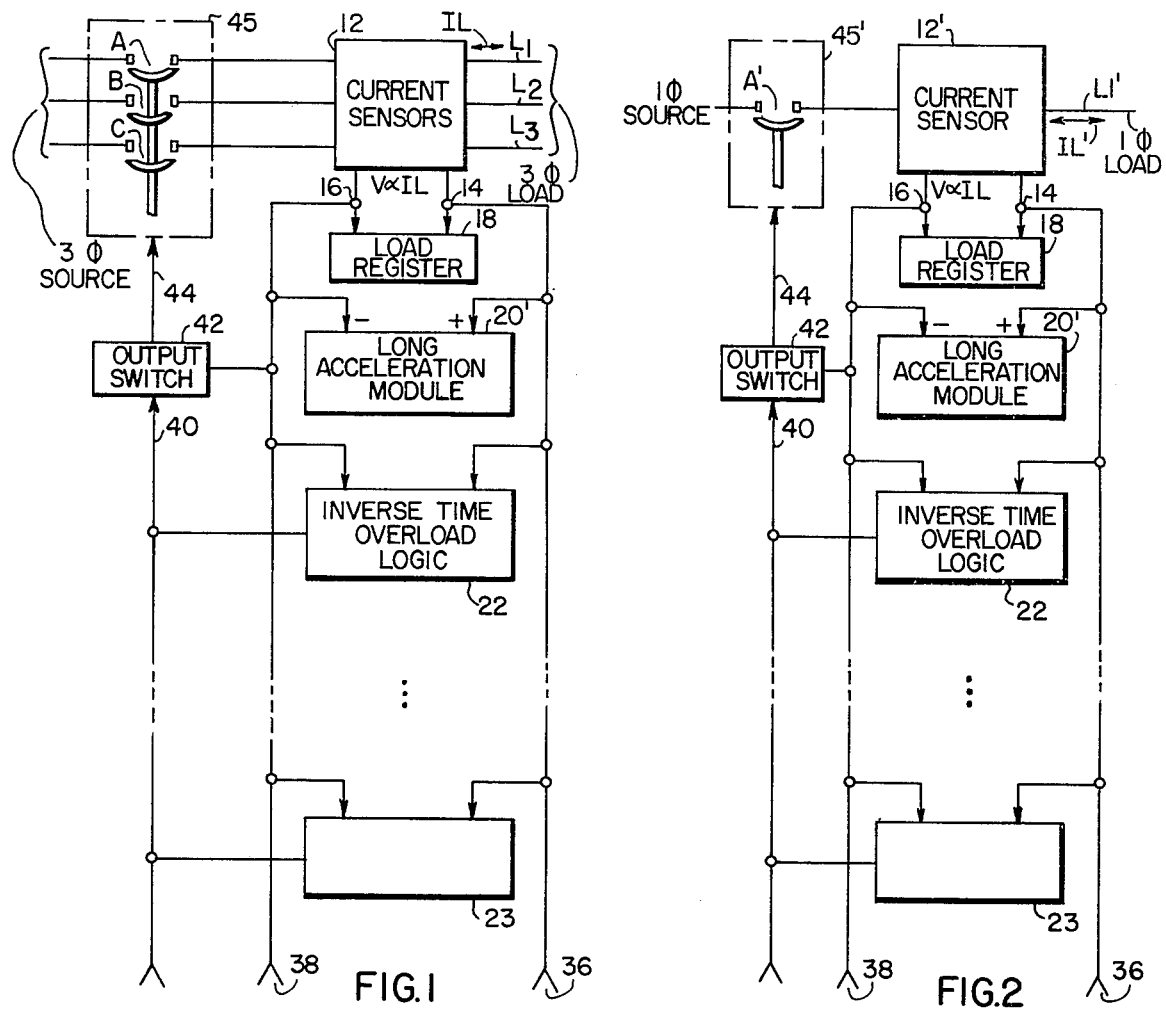
FIG. 1 shows a universal plug-in type control system for a circuit breaker for a three-phase electrical system utilizing a long acceleration module.
FIG. 2 shows a system similar to that shown in FIG. 1 but for a single-phase electrical system.

Referring now to the drawings and FIG. 1 in particular a circuit protective system for a three-phase load is shown. In a preferred embodiment of the invention the three-phase load may comprise a three-phase electrical motor. The three-phase load is shown on the right of the lines L1, L2 and L3. On the left there is shown a place where a three-phase source of electrical current may be utilized to drive the three-phase load. Interposed between the connecting terminals for the three-phase source and the connecting terminals for the three-phase load in the lines L1, L2 and L3 are a circuit breaker 45 and current sensors 12. The current sensores 12 sense the magnitude of current IL flowing in any of the lines L1, L2 and L3 and provide an output voltage V at terminals 14 and 16 which is related to IL. In this embodiment of the invention a load resistor 18 is connected between the lines 16 and 14. The load resistor performs a function described previously with respect to copending Application Ser. No. 504,404. Also shown connected in parallel relationship with the lines 14 and 16 are an inverse time overload logic module 22 and a long acceleration module 20'. The long acceleration module 20' is utilized to limit the voltage V at the terminals 14 and 16 to a value, during motor startup, which will permit the relatively high currents of motor acceleration to continue without causing the circuit breaker or circuit interrupting apparatus 45 to be tripped. After a predetermined time the long acceleration module 20' is cut out of the circuit so that the inverse time overload logic module 22 may react to a wider range of voltages V between the terminals 14 and 16 to thus energize the line 40 to consequently energize the output switch 42 to thus trip the circuit breaker 45 by way of the line 44 should currents IL of a sufficiently high magnitude flow in the lines L1, L2 or L3. Also shown is an unmarked module 23 which represents other modules which may be connected to the output terminals 14 and 16 of the current sensors for providing other circuit functions. Still other modules may be interconnected at the lines or input terminals 36 and 38.

Referring now to FIG. 2 a system similar to that shown in FIG. 1 but for utilization with a single phase load and single phase source is shown. On the right is shown the connection to the single phase load and on the left is shown the connection to the single phase source. Disposed in the line L1' is a circuit breaker 45' (having a single separable main contact A') and a current sensor 12'. The current sensor 12' is utilized to monitor the current IL' flowing in the load L1' and thus provides a voltage V at output terminals 14 and 16 which is related to the latter mentioned current. Similar to the circuit of FIG. 1 a load resistor 18, a long acceleration module 20' and an inverse time overload logic module 22 is provided as well as the representative module 23, all modules are connected in parallel circuit relationship between the terminals 14 and 16 of the current sensor 12'. Once again the auxiliary terminals 36 and 38 are shown for performing the same function as described with respect to FIG. 1. An output switch 42 is provided for driving a line 44 which in turn operates or energizes the circuit breaker 45' in response to a signal provided on the line 40 from the inverse time overload logic module 22 or the representative module 23. The operation of the inverse time overload logic module 22 in cooperation with the long acceleration module 20' is essentially the same as that described with respect to FIG. 1.

Figure 3:
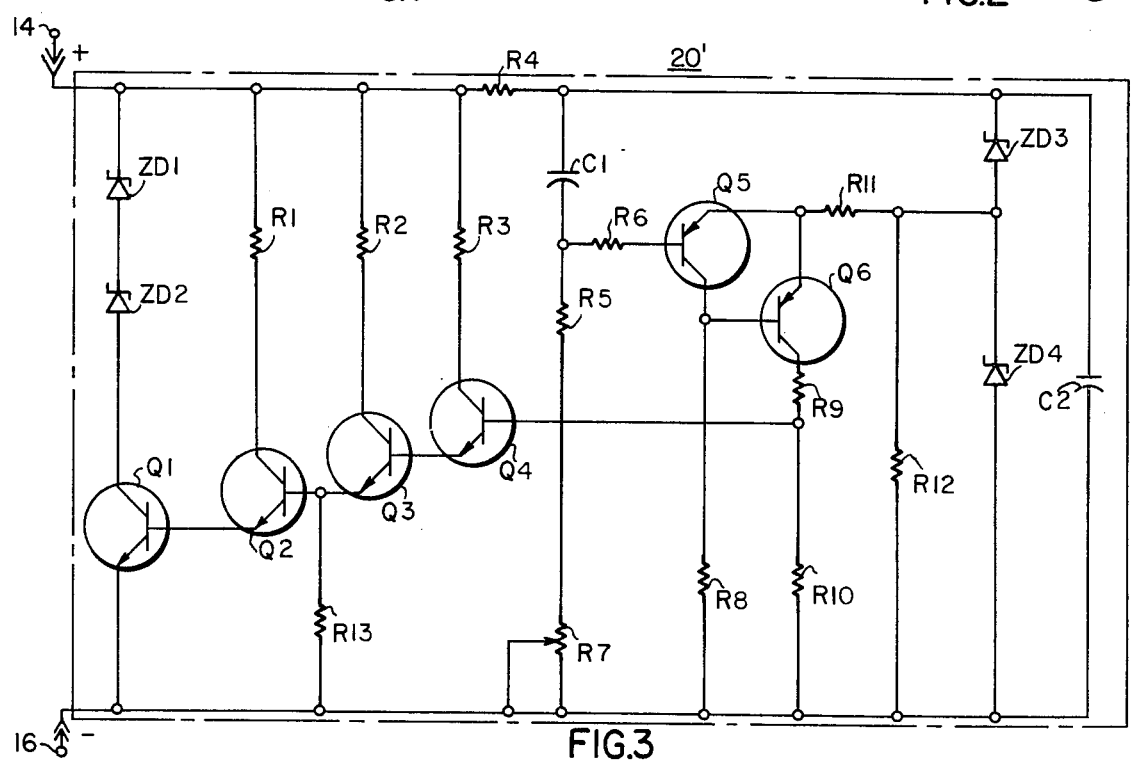
FIG. 3 shows a schematic diagram of the long acceleration module depicted in FIG. 1 and FIG. 2.

Referring now to FIG. 3 a schematic diagram of the long acceleration module 20' is shown. The plus(+) and minus (−) terminals are shown interconnected schematically with the output terminals 14 and 16 respectively although it is to be understood that this is merely an illustrative example and does not limit the polarity of the terminals 14 and 16. This means that terminal 16 could be the positive terminal and be shown at the top of FIG. 3 while terminal 14 could be the negative terminal and be shown at the bottom of FIG. 3. Connected to the positive terminal is the regulating terminal of a Zener diode ZD1 and one end each of resistive elements R1, R2, R3 and R4. Connected to the other end of the resistive element R4 are one end each of capacitive elements C1 and C2 and the regulating terminal of a Zener diode ZD3. Connected to the other end or anode of the Zener diode ZD1 is the regulating terminal or cathode of a Zener diode ZD2. Connected to the anode of the Zener diode ZD2 is the collector of a transistor Q1, the emitter of which is connected to the negative terminal. Connected to the other ends respectively of the resistive elements R1, R2 and R3 are the collectors of transistors Q2, Q3 and Q4 respectively. The emitter of transistor Q4 is connected to the base of transistor Q3. The emitter of transistor Q3 is connected to the base of transistor Q2. The emitter of transistor Q2 is connected to the base of transistor Q1. Consequently it can be seen that the transistors Q2 and Q4 act as current magnifying cascaded amplifiers for driving the base of the transistor Q1. One end of a resistive element R13 is connected to the junction between the base of the transistor Q2 and the emitter of the transistor Q3. The other end of the resistive element R13 is connected to the negative terminal. The other end of the capacitive element C2 is also connected to the negative terminal. Connected to the anode of the Zener diode ZD3 are the regulating terminal of another Zener diode ZD4 and one end each of resistive elements R11 and R12. The other end of the Zener diode ZD4 and the other end of the resistive element R12 are connected to the negative terminal. The other end of the resistive element R11 is connected to the emitters of transistors Q5 and Q6. The collector of transistor Q5 is connected to the base of transistor Q6 to form a transistor pair Q5–Q6. Also connected to the base of the transistor Q6 is one end of a resistive element R8, the other end of which is connected to the negative terminal. Connected to the collector of the transistors Q6 is one end of a resistive element R9, the other end of which is connected to the base of the previously described transistor Q4 and to one end of a resistive element R10, the other end of which is also connected to the negative terminal. The other side of the capacitive element C1 is connected to one end each of a resistive element R5 and R6. The other end of the resistive element R6 is connected to the base of the transistor Q5. The other end of the resistive element R5 is connected to one end of a resistive element R7, the other end of which is connected to the negative terminal. Resistive element R7 may be a potentiometer having a wiper which is utilized for removing part of the resistance of the resistive element R7. Depending on the setting of the wiper of resistive elemet R7 the charging time for the capacitive element C1 can be increased or decreased thus increasing or decreasing the period of time for which the inverse time overload logic module 22 of FIG. 1 and FIG. 2 may be diabled by the long acceleration module 20'.

OPERATION OF THE LONG ACCELERATION MODULE

By referring once again to FIG. 1 and FIG. 2 it can be seen that in the case of either a three-phase load as with FIG. 1 or a one-phase load as with FIG. 2, the situation may develop where the line current IL or IL' as the case may be becomes excessively large due to rotor lockup or the like. If such is the case the voltage between the terminals 14 and 16 will grow large. This voltage will be impressed across the inverse time overload logic module 22 where a trip signal will be developed for application to line 40. The time it takes the trip signal to be provided to line 40 is usually inversely related to the value of the voltage between the terminals 14 and 16. Consequently, the higher the voltage the quicker the signal is applied to line 40. Of course when the signal is applied to line 40 the output switch 42 is energized or actuated causing a signal to be applied to line 44 to cause the circuit breaker 45 or 45', as the case may be, to trip to protect the three-phase or single-phase load as the case may be. It is known, however, that during normal motor startup that the currents IL or IL' would become very large, and as far as the current sensors 12 and 12' are concerned, the output voltage thereof would reflect that situation. The voltages would be large because starting currents are typically large. However, it is known that these currents may be tolerated by the motor. Consequently the inverse time overload logic module should not be energized to cause a subsequent opening of the circuit breaker 45 or 45', as the case may be. To accommodate this a long acceleration module 20' is provided. The long acceleration module will override the inverse time overload logic circuit 22 in each case during a predetermined amount of time when the motor is being started up. This means that the large startup currents will not cause an inadvertent trip of the circuit breaker. However, after the motor has started it is desirous to once again allow the inverse time overload logic module 22 to perform its task of protecting the three-phase or single-phase load as the case may be.

Referring once again to FIG. 3 electrical apparatus representative of the long acceleration module 20' is shown. The terminals 14 and 16 of the current sensors 12 and/or 12' of FIG. 1 and FIG. 2 are also shown interconnected with the plus and minus terminals of the logic module 20'. As soon as some voltage is developed across the plus and minus terminals, the capacitive element C2 begins to charge through the resistive element R4 between the plus and minus terminals. Eventually the capacitive element C2 acquires a voltage which is sufficient to break down the Zener diode ZD3. Consequently current flows through the Zener diods ZD3 and through the resistive element R12 causing the Zener diode ZD3 to regulate at its regulating voltage, which for example may be 6.8 volts. This 6.8 volts provides current through the resistive element R11 and through the transistor element Q6. This occurs provided the transistor element Q6 is on, which will be the case if the transistor element Q5 is offf. The transistor element Q5 will be off as long as its emitter is at a lower voltage than its base. It can be seen that the voltage at the base is approximately equal to the voltage at the right side of the resistive element R4 because the capacitive element C1 is of such a magnitude as not to be charged nearly as fast as the capacitive element C2. In addition the Zener diode ZD3 provides approximately 6.8 volts of voltage difference between the top of the capacitive element C1 and the emitter of transistor Q5. This generally guarantees that the transistor element Q5 is turned off which allows the transistor element Q6 to be in the on or conducting state. Consequently the current which is flowing through the transistor element Q6 flows through the resistive element R9 and then moves through the base to emitter circuits of the transistors Q4, Q3, Q2 and Q1. During each successive state, of course, the emitter current of the previous stage is amplified and provided as base drive current for the next stage. The net result of this is to generally quickly turn on the transistor element Q1 as voltage is applied between the plus and minus terminals. This of course inserts the Zener diodes ZD1 and ZD2 between the plus and minus terminals. These Zener diodes which in a preferred embodiment of the invention may have a total regulating voltage of 15 volts, therefore generally guarantee that the input voltage to the inverse time overload logic module 22, as shown in FIG. 1 and FIG. 2, will not exceed the Zener diode breakdown voltage thereof even though the voltage as the output terminals 16 and 14 would attempt to become larger because of a corresponding increase in current IL and IL'. The resistive elements R1, R2 and R3 are collector resistors for the cascaded amplifiers Q2, Q3 and Q4 respectively. The resisitive element R13 is a stabilizing resistance to shunt leakage current from the base of the transistor Q2. In a like manner the resistive element R8 is a collector current limiting resistor for the transistor Q5. The combination of the resistive elements R9 and R10 provide the same effect for the transistor Q6. Eventually a value of voltage is reached which causes both the Zener diodes ZD3 and ZD4 to regulate to maintain the voltage across the capacitive element C2 at some reasonable voltage which in a preferred embodiment of the invention may be 12 volts. The preceding happens relatively quickly in the operation cycle of the long acceleration module 20'. Meanwhile the capacitive element C1 which remains virtually uncharged during the preceding portion of the operation cycle begins to develop a charge thereacross because of current flowing from the plus terminal through the resistive element R4, through the capacitive element C1, through the resistive element R5 and through the variable resistive element R7 to the negative terminal. As the capacitive element C1 charges it begins to lower the base voltage on the transistor Q5 by way of the base drive resistor R6 until a base voltage is reached which is less than the voltage on the emitter of the transistor Q5. When this occurs the transistor Q5 will turn on. This will cause the transistor Q6 to turn off which will then interrupt the base drive current for the transistor Q4. When this happens the remaining transistors Q1, Q2 and Q3 turn off as no base drive current is available to maintain them in the on state. When the transistor Q1 turns off, the Zener diodes ZD1 and ZD2 are essentially disconnected from between the plus and minus terminals. This then allows the inverse overload logic module 22 of FIG. 1 and FIG. 2 to have a voltage impressed thereacross which is unregulated by the long acceleration module 20'. By the time this happens the effect of overload currents IL and IL' due to motor startup will have disappeared and any further increase or subsequent increase in overload current, which may be due to motor lockup will cause timely tripping of the circuit breaker 45 or 45' as the case may be. In a situation such as this it is desirous for the inverse time overload logic module to operate normally to cause a tripping function to occur for the circuit breakers 45 and 45' as the case may be. When the three-phase or single-phase load is shut down or the circuit breakers 45 or 45' are opened the voltage between terminals 14 and 16 will drop to zero. When this happens the capacitive element C1 will discharge through the resistive elements R4, R5 and R7 and the load resistor 18 shown in FIG. 1 and FIG. 2. This sets up the circuit 20' for a subsequent future long acceleration during the next motor startup operation. Of course the capacitive element C2 will also discharge in a similar manner.

It is understood with respect to the embodiments of this invention that the utilization of NPN type transistors for transistors Q1, Q2, Q3 and PNP type transistors for transistors Q4, Q5 and Q6 of the apparatus of FIG.

3 is not limiting and that PNP or NPN transitors respectively may be utilized provided proper voltage polarity is provided. It is also to be understood that the Zener diodes ZD1 and ZD2 may be replaced by a single Zener diode provided it has the regulating characteristics necessary to accomplish the purposed of this invention. In the embodiment of FIG. 3 two Zener diodes ZD1 and ZD2 are used to provide approximately 15 volts of regulation during the motor startup period of operation. It is also to be understood that the cascaded amplifiers Q1 through Q4 may be replaced under appropriate circumstances by less transistors provided the proper amplification can be accomplished. It is also to be understood that the utilization of the potentiometer R7 is not limiting. It is also to be understood that the various voltage values described as practical examples for illustrative purposes are not limiting. It is also to be understood that the system may be utilized on multiphase loads other than the three-phase load shown in FIG. 1. It is also to be understood that with modification the apparatus of FIG. 2 may even be utilized on direct current electrical systems. It is to be understod that the element 45 may be a contactor, a relay or any circuit interrupting device. It is also to be understood that the apparatus taught in this invention may utilize 60 Hz power or power of other frequencies.

The apparatus taught in this invention has many advantages. One advantage lies in the fact that the combination of the long acceleration module and the inverse time overload logic module provide for motor startup without actuating the circuit breaker 45 or 45' as the case may be to trip and thereafter provides for adequate protection of lines 11, 12 and 13 when excessively high currents flow therein. This is due to the fact that the long acceleration module 20' of FIGS. 1 and 2 is cut out after a predetermined startup period. Another advantage lies in the face that the circuitry is generally solid state or static requiring no moving parts and consequently is highly reliable.

What we claim as our invention is:
1. An electrical circuit protecting device, comprising:
   sensor means for sensing circuit current in an electrical circuit and for providing an ouput voltage which is related to said circuit current, said electrical circuit being capable of providing electrical current to an electrical load which has the characteristic of drawing a relatively high value of said current when initially interconnected to said circuit, said current becoming significantly lower in value after said load has been interconnected to said circuit for a predetermined period of start-up time;
   circuit interrupter trip means having separable main contacts connected in circuit relationship with said electrical circuit for interrupting electrical current therein;
   inverse time overload means connected in circuit relationship with said sensor means for responding to said output voltage and for providing a trip signal to said circuit interrupter drive means, said latter signal being provided at a time which is iversely proportional to the magnitude of said electrical circuit current after said electrical circuit current is sensed and provided said magnitude of said electrical current persists; and
   long acceleration override means connected in circuit relationship with said sensor means and said overload means, said override means comprising zener diode means for providing a fixed voltage to said overload means regardless of said high value of current flowing in said electrical circuit for a time span extending from the time said load is interconnected to said circuit until after said predetermined period of start-up time has expired, override timer means, said override time means initiating and terminating said time span by controlling said zener diode means.

2. The combination as claimed in claim 1 wherein said override means timer comprises a resistive-capacitive charging network connected in circuit relationship for being charged by said output voltage.

3. An electrical circuit protecting device, comprising:
   sensor means for sensing circuit current in an electrical circuit and for providing an output voltage which is related to said circuit current, said electrical circuit being capable of providing electrical current to an electrical load which has the characteristic of drawing a relatively high value of said current when initially interconnected to said circuit, said current becoming significantly lower in value after said load has been interconnected to said circuit for a predetermined period of start-up time;
   circuit interrupter trip means having separable main contacts connected in circuit relationship with said electrical circuit for interrupting electrical current therein;
   inverse time overload means connected in circuit relationship with said sensor means for responding to said output voltage and for providing a trip signal to said circuit interrupter drive means, said latter signal being provided at a time which is inversely proportional to the magnitude of said electrical circuit current after said electrical circuit current is sensed and provided said magnitude of said electrical current persists; and
   long acceleration override means connected in circuit relationship with said sensor means and said overload means, said override means comprising zener diode means connected in circuit relationship with transistor means for providing a fixed voltage to said overload means regardless of said high value of current flowing in said electrical circuit for a time span extending from the time said load is interconnected to said circuit until after said predetermined period of start-up time has expired, override timer means, said overrride timer means initiating and terminating said time span by controlling said transistor means which control said switched voltage zener diode means.

4. The combination as claimed in claim 3 wherein said override means timer comprises a resistive-capacitive charging network connected in circuit relationship for being charged by said output voltage.

* * * * *